United States Patent [19]
Golden et al.

[11] Patent Number: 5,774,872
[45] Date of Patent: Jun. 30, 1998

[54] AUTOMATED TAXABLE TRANSACTION REPORTING/COLLECTION SYSTEM

[75] Inventors: Richard Golden, 15530 Windmill Pointe, Grosse Pointe, Mich. 48320; Joel R. Stanesa, Clawson, Mich.

[73] Assignee: Richard Golden, Grosse Pointe, Mich.

[21] Appl. No.: 717,977

[22] Filed: Sep. 23, 1996

Related U.S. Application Data

[63] Continuation of Ser. No. 414,944, Mar. 31, 1995, abandoned.

[51] Int. Cl.$^6$ .......................... G06F 17/60; G06F 157/00
[52] U.S. Cl. ................................ 705/19; 705/20; 705/21; 705/31; 235/376; 235/383; 235/385
[58] Field of Search ..................................... 395/219, 220, 395/221, 216, 217, 224, 231; 235/375, 385

[56] References Cited

U.S. PATENT DOCUMENTS

| | | | |
|---|---|---|---|
| 3,156,412 | 11/1964 | Julius et al. | 235/146 |
| 3,946,220 | 3/1976 | Brobeck et al. | 395/225 |
| 4,144,567 | 3/1979 | Tadakuma et al. | 364/405 |
| 4,814,985 | 3/1989 | Swistak | 364/405 |
| 4,972,504 | 11/1990 | Daniel, Jr. et al. | 455/2 |
| 5,138,549 | 8/1992 | Bern | 364/408 |
| 5,220,501 | 6/1993 | Lawlor et al. | 364/408 |
| 5,335,169 | 8/1994 | Chong | 364/408 |
| 5,335,171 | 8/1994 | Fuyama | 364/405 |
| 5,396,417 | 3/1995 | Burks et al. | 364/401 R |
| 5,398,799 | 3/1995 | Ranon et al. | 194/216 |
| 5,420,405 | 5/1995 | Chasek | 235/379 |
| 5,510,979 | 4/1996 | Moderi et al. | 395/218 |
| 5,623,403 | 4/1997 | Highbloom | 395/228 |

OTHER PUBLICATIONS

Author Unknown, "Taxing Issues", *Industry Week*, vol. 244, No. 13, p. 13—Dialog File 47, Acc. #04287447, Jul. 3, 1995.
Author Unknown, "This Week's Lead Story #1: Highwaymaster, TTSI to Offer Automated Fuel Tax Reporting", *Inside Its*, 3 pages, Dialog File 16, Acc #06366082, Sep. 11, 1995.
*Everest;* Database Management Textbook Published by McGraw–Hill, Inc. in 1986; p. 746.
The Office, "Paper–Free Tax Returns . . . at the Touch of Your Telephone", The Office, V118, n1, p. 22(1), Dialog File 75, Acc #00163347.
"Its the IRS Prepared for your Tax return?", Weiner, Leonard, US News & World Report, 100 p. 51(2), Mar. 1986, Dialog File 47, Acc #02800657.

*Primary Examiner*—David R. Hudspeth
*Assistant Examiner*—Joseph Thomas
*Attorney, Agent, or Firm*—Gifford, Krass, Groh, Sprinkle, Patmore, Anderson & Citkowski, P.C.

[57] ABSTRACT

An automated transaction tax reporting/collection system. The system includes individual point of sale terminals disposed at each remote vendor location. The point of sale terminals are networked to a central computer, preferably via a plurality of intermediate data collection sub-stations. Each terminal includes means for inputting and storing data regarding taxable transactions, as well as for storing data reflecting the tax accrued on each transaction. This stored data is collected on a periodic, rotating basis by the corresponding data collection sub-station according to control signals generated by the central computer. All of the collected data is ultimately transmitted to the central computer, which is operative to generate reports reflecting the transaction tax due from each remote vendor location. These reports may then be sent to the taxing authority, the individual merchants, and/or to other taxing authorities, such as the federal government. Preferably, each point of sale terminal also includes a printer which prints an official tax receipt for each transaction recorded.

9 Claims, 3 Drawing Sheets

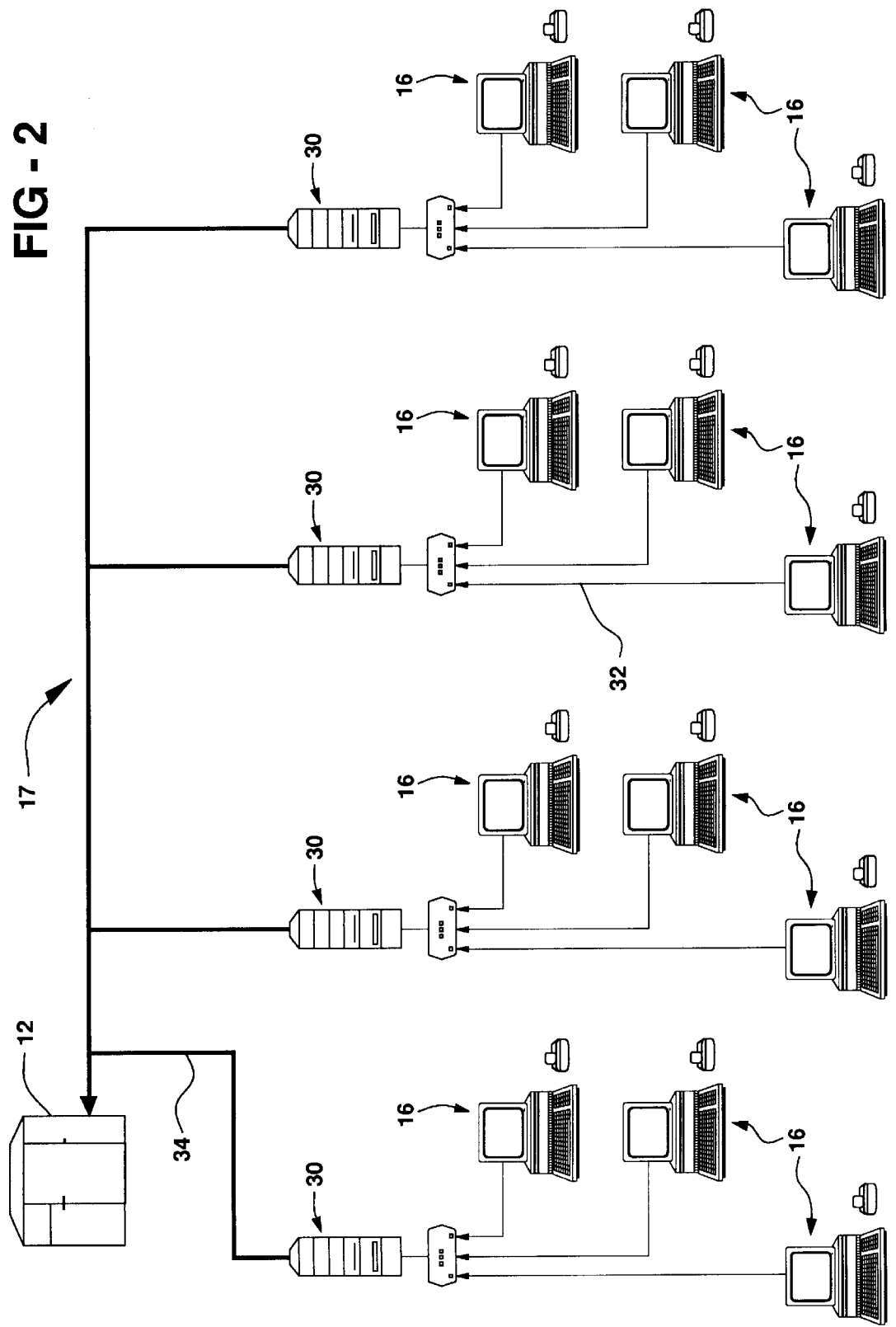

AUTOMATED TAXABLE TRANSACTION REPORTING/COLLECTION SYSTEM

This is a continuation of application Ser. No. 08/414,944 filed on Mar. 31, 1995 now abandoned.

FIELD OF THE INVENTION

This invention concerns the field of automatic tax calculation and collection and, more particularly, to such a system including a network of point of sale terminals linked to a central data analysis and tracking location via a plurality of data collection sub-stations.

DESCRIPTION OF THE RELEVANT PRIOR ART

The budgets of many governmental authorities are heavily dependent upon the accurate calculation and collection of various type of "transaction" taxes. For example, these transaction taxes include sales taxes, taxes on services, value added taxes, etc. Such transaction taxes automatically accrue each time such a transaction (whether sales, services, etc.) occurs or is performed. As can well be imagined, the number of taxable transactions occurring on a daily basis within the juridication of a typical taxing authority is huge. For example, the number of individual sales made daily in a state which imposes a sales tax is enormous, and can easily run into the tens of millions or even more.

Due to the sheer magnitude of such transactions, keeping track of each individual one has heretofore proved impossible. Thus, the only practical method of collecting transaction taxes has been to impose the obligation upon the seller or service provider to automatically add the tax due onto the consumer's bill for goods or services. Thus, the merchant collects the tax from the customer as the sale of goods or services occurs. Electronic cash registers which automatically compute the transaction tax on the basis of the amount of the sales or service transacted, then prints these amounts on a receipt are very well known in the prior art. For example, such an electronic cash register is disclosed in U.S. Pat. No. 4,144,567.

Thus, it has not proved difficult for the merchant to collect such transaction taxes from customers, particularly since customers have become used to this process. After collecting transaction taxes from the customer, the merchant is, in turn, obligated to turn these proceeds over to the taxing authority. Typically, this is done periodically (such as monthly or quarterly), with the merchant reporting total sales for the period, calculating the taxes due on the total sales, and remitting the calculated taxes to the taxing authority. Hence, this mode of collecting transaction taxes is heavily dependent upon the integrity of the individual provider of goods or services.

Of course, many merchants keep scrupulous records and fully remit all taxes owing to the appropriate taxing authority. Unfortunately, others are not so scrupulous. It is a common practice for merchants to under-report their gross receipts; since the transaction tax is generally based on a percentage of gross receipts, under-reporting of gross receipts obviously diminishes the amount of tax. Thus, instead of all of the taxes collected from customers going to the public taxing authority, a certain percentage of it winds up in the pockets of merchants. Some of this tax pilferage originates from individual employees, such as sales clerks, but some of it also is committed by business owners, themselves.

While it is difficult to know for certain the extent of under-reporting and under collection of transaction taxes, some believe that as much as 30% or more of sales and service taxes owing state governments are never collected. Of course, this revenue shortfall leads to increased general levels of taxation in order to compensate for the shortfall. Thus, the customer who has dutifully paid a transaction tax to the merchant is doubly victimized when the merchant fails to transmit the collected tax to the state; the money which the state fails to collect cannot be spent for the public good, and the customer must pay higher taxes to compensate for the missing money. Thus, the problem of under-reported and uncollected transaction taxes results in governmental debt and higher taxes.

It would be desirable to have a tax reporting and collection system which does not rely solely on the integrity of the individual merchant, but which takes transaction tax reporting out of the merchant's control.

It would be further desirable if such a system provided for automatic monitoring and reporting of dollar amounts of transactions subject to tax, as well as the tax amounts due from each such transaction.

It would be further desirable to provide such a system with the capabilities of automatically collecting the taxes owed, thus relieving the individual of considerable time and paperwork.

SUMMARY OF THE INVENTION

Disclosed and claimed herein is a system for automatically reporting taxable transactions to a central location. The central location can be the governmental taxing authority, itself, such as a state treasury department. However, in another embodiment, the central location will be a private service licensed by the state to perform such reporting and/or collecting activities.

The present system relies on the electronic transmission of data which represents taxable transactions and the taxes generated thereby. For example, such data can be digitally transmitted over telephone lines, although other electronic data links could be used. The present system relies on such electronic transmission of data, as well as on electronic storage of data within memory storage devices, such as computer memories.

To that end, the system includes a central computer which is disposed at a central location, such as a private service under contract from the taxing authority. The central computer includes a database which has a data file corresponding to each of a plurality of remote vendor locations. Typical remote vendor locations include wholesale and retail stores, restaurants, bars, hotels and motels, recreational centers and sports arenas, fast food outlets, professional service providers such as a doctors', dentists', or lawyers' offices, beauty and barber shops, etc. The present system can also embrace remote vendor locations of a more transitory nature, such as craft shows, outdoor art shows, flea markets, etc., as will be explained in greater detail below.

At least one point-of-sale, taxable transaction terminal is disposed at each remote vendor location. Of course, in many cases, a remote vendor location will include many such terminals, such as a large department store or supermarket. Each taxable transaction terminal includes means for entering a first numeric value representing each taxable transaction performed in connection with said terminal. For example, a taxable transaction terminal could be designed as a conventional electronic cash register and include a plurality of input keys for entering numeric values representing the goods and sales transactions being carried out on the terminal.

Each transaction terminal also includes means for entering a second numeric value representing the tax due for each such taxable transaction occurrence. This second value is based on the first value and reflects the applicable tax rate. Preferably, the terminal will automatically generate the second value and enter it internally. In other cases, the second value may be inputted like the first value. The terminal further includes means for storing the first and second numeric values. In one embodiment of the system of the present invention, the storing means stores each first and second value separately for each transaction which has occurred on a particular transaction terminal. In a second embodiment, the storage means keeps a running tally of a total value of the transactions and the total calculated taxes that are generated on a particular terminal. Finally, each terminal also includes means for generating transmissible data representing the stored first and second numeric values, whether stored as individual transactions, or stored as sums.

In one embodiment of the system of the present invention, the central computer is in communication with each taxable transaction terminal via an electronic data link connecting the two. The computer is programmed to interrogate each transaction terminal on a periodic basis. When so interrogated, each terminal is operative to generate the transmissible data concerning the transactions which have occurred on the terminal so that they can be transmitted via the electronic data link to the central processing unit. The central computer is further programmed to store such transmitted data in the appropriate data file for the particular remote vendor location at which the transaction terminal in question is located.

However, due to the size of a typical governmental taxing authority (such as a state government), the direct transmission of data between each transaction terminal and the central computer may prove impractical. Thus, one alternative embodiment of the system of the present invention contemplates a plurality of data collection sub-stations interposed in the data stream flowing between the point of sale terminals and the central computer. Each data collection sub-station services a portion of the plurality of point of sale terminals. Thus, rather than transferring data directly to the central computer, this portion of the plurality of point of sale terminals will instead transfer data to the associated data collection sub-station. The number of data collection sub-stations needed to operate the system will depend, of course, upon the total number of point of sale terminals, as well as on how many terminals a single data collection sub-station can service.

Each data collection sub-station is electronically linked (such as via telephone lines) with both the central computer and with each point of sale terminal. The data collection sub-stations of this embodiment of the present system are, preferably, under the control of the central computer. Thus, the central computer sends control signals via the data link to each data collection sub-station directing it to perform a data collection routine for each point of sale terminal. The data collection routine is performed for each point of sale terminal on a periodic, rotating basis. That is, the central computer directs each data collection sub-station to contact each point of sale terminal on a periodic basis (such as a daily or weekly, for example). When so contacted, the point of sale terminal downloads stored data concerning the sales totals and the calculated tax. In the embodiment in which each point of sale terminal keeps track of these values as running totals, the transmission of the totals for each value to the data collection sub-station will take only a short period of time. When the data collection sub-station has received data transmitted by one point of sale terminal, it is then directed by the central computer to contact another point of sale terminal to initiate another data transmission routine, and so on until it has contacted all of its respective point of sale terminals, at which point it is ready to begin the rotation again.

The data collected from the point of sale terminals in this fashion by the data collection sub-stations are, in turn, transmitted to the central computer. In other words, in this embodiment, the data collection sub-systems function as relay terminals in a data collection network. Since there are far fewer data collection sub-stations than point of sale terminals, two way, continuous electronic linkage between each data collection sub-station and the central computer is possible via dedicated phone lines. Thus, each data collection sub-station continuously transmits the data collected from the point of sale terminals on to the central computer as it is received by the data collection sub-stations. Alternatively, the system could provide for periodic, rotating communication between the central computer and the data collection sub-stations.

The point of sale terminal disposed at each remote vendor location can take several forms. For example, it may be a specially provided stand alone terminal which includes a keyboard, a display screen, processor for calculating the appropriate tax on each transaction, some means of digital storage, such as semiconductor or magnetic memory, means such as a phone jack for linking the terminal to the electronic network and, preferably, a printer for printing an authorized sales receipt to the customer. Such stand alone terminals may be specially designed and leased to each merchant, or it may be possible to adapt existing electronic cash registers to operate in the system. The terminal preferably includes a printer for generating an "official" tax receipt to the customer to help ensure merchant compliance.

Alternatively, a point of sale terminal may simply be a personal computer (which already includes a keyboard, display means, processing unit, and memory) appropriately programmed to function in the present system. Such a "software only" terminal might be particularly useful at remote vendor locations which do not normally operate cash registers, but do use personal computers, such as, for example, medical, dental and other professional offices.

In a third embodiment of the point of sale terminal useful with the present system, the terminal is a self contained, portable unit. By appropriately downsizing the components, the portable terminal can be small enough to be hand held and, yet, contain input means, display, processor, and memory. Unlike the stand alone and software only terminals, the portable terminal will typically not be connected to the data network. It may be used in remote locations where such data connection would be impossible. However, the portable terminal is provided with a conventional telephone jack and may be connected to the network via a standard telephone. While the portable terminal alone cannot, of course, be automatically and periodically contacted by the data collection sub-station as is the case for the other types of terminals, it is possible to design the terminal, either by programming or hard wiring, so that it is functional only if connected to the network on a periodic basis to download data.

The data collected by the central computer is stored in the appropriate data files. The central computer is programmed to analyze the collected data and provide, either on a periodic basis or upon request, various types of reports and summaries. For example, the central computer may generate for each merchant a periodic report reflecting the total value of transactions performed by the merchant and the total value of the transaction tax generated by the transactions during that period. When provided with such reports, the governmental taxing authority will then know exactly how much transaction tax is due from each merchant. The taxing authority can use this information to directly assess the tax due to each merchant, or can use it to verify the amounts actually sent by the merchant. In another embodiment, the system of the present invention further includes electronic data links to financial institutions to provide for the automatic collection of the taxes owing, thus considerably streamlining the collection process.

The central computer can also generate a report for each merchant on a periodic basis, such reports again reflecting the total value of the transactions for the period as well as the tax generated thereby. Such information can be very useful to merchants who suspect theft by employees since these reported figures may be checked against the merchant's own records.

The central computer of the present system may also be used to generate non-compliance reports of a merchant whose tax payments do not match the accumulative totals for the tax reporting period. The automatic reporting and cross checking features of the present system virtually eliminate the problem of under-reporting and greatly aid the collection of taxes due.

The system may also perform other functions, such as generating reports on taxes accrued, as well as taxes paid, a very useful feature for the taxing authority. Furthermore, the data collected and analyzed by the system may also be useful to other governmental institutions. For example, if the system of the present invention is employed as an automatic state sales tax reporting and collection system, the data may be very useful to the federal government for income tax collection purposes.

BRIEF DESCRIPTION OF THE DRAWINGS

The following detailed description is best understood by reference to the following drawings in which:

FIG. 2 is an overall, schematic view of the data collection network of the present invention;

DETAILED DESCRIPTION OF THE PREFERRED EMBODIMENTS

Figure 1:
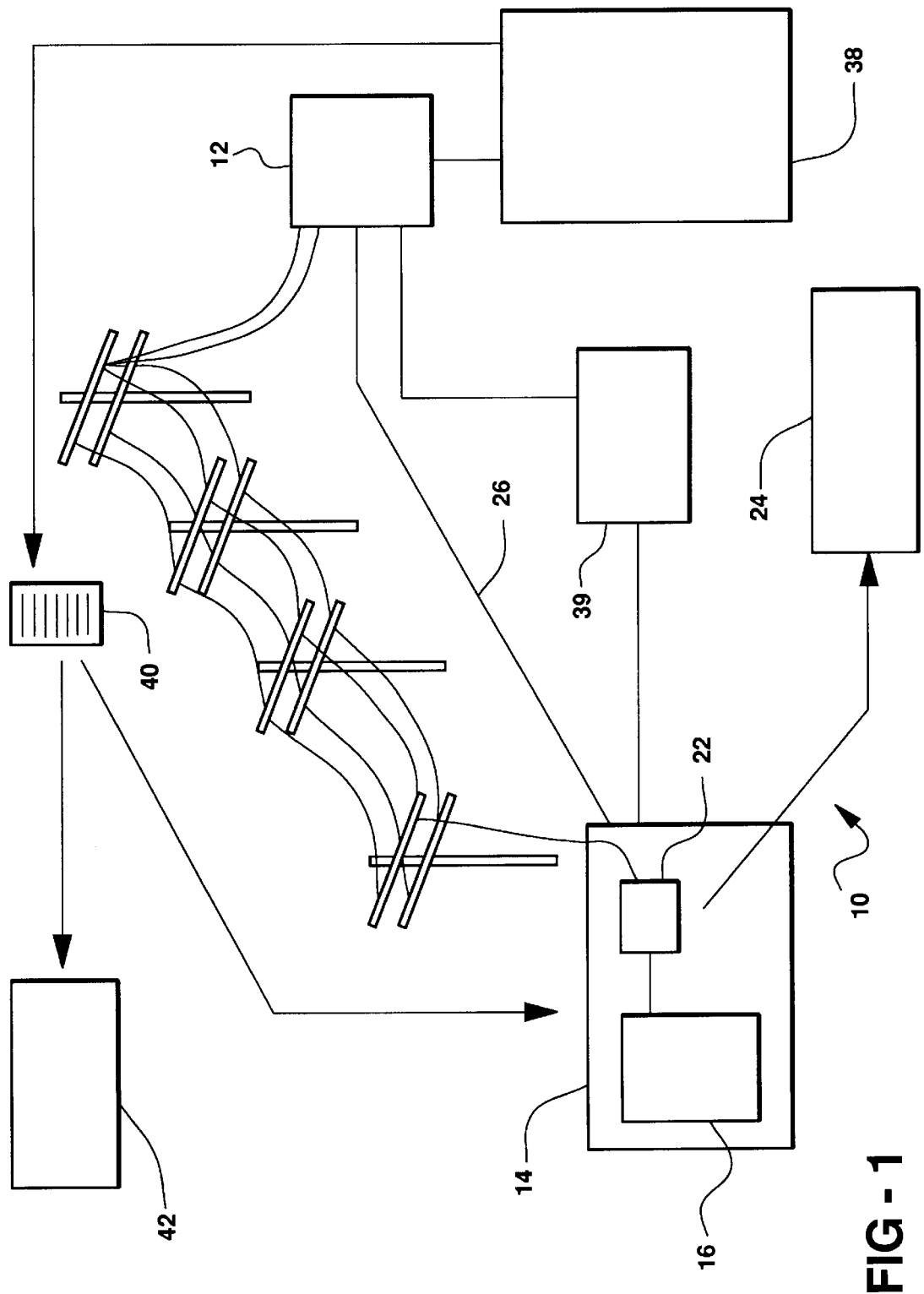
FIG. 1 is a schematic, overall view of an automatic transaction tax reporting system according to the present invention.

Throughout the following detailed description, like numerals are used to reference the same element of the present invention shown in multiple figures thereof. Referring now to the drawings, and in particular to FIGS. 1 and 2, there is shown schematically an automatic transaction tax reporting system 10 according to the present invention. The system is useful for the reporting and collection of any type of transaction tax, such as sales tax, service tax, value added tax, etc. In the ensuing description, the system 10 finds application as a state sale tax collection and reporting system, though it is to be understood that the described system is not limited to that particular application.

The system 10 includes a central computer 12 which includes a processor and an associated data storage facility. Since the central computer 12 must process and analyze a great deal of data, it typically will be a main frame computer, although a network of smaller computers could also be utilized. The data storage facilities associated with the central computer 12 are correspondingly large, and may include any type of conventional data storage, such as semiconductor memory, magnetic memory, optical and magneto-optical storage, etc., as well as any combinations thereof.

The system 10 further includes a plurality of point of sale terminals 16 disposed at a plurality of remote vendor locations 14. Although FIG. 1 depicts only one such remote vendor location 14 and one associated point of sale terminal 16, it is to be understood that the system of the present invention finds particular utility when at least one point of sale terminal 16 is disposed at every remote vendor location 14 (such as stores, restaurants, sporting facilities, etc.) contained within the jurisdiction of the state taxing authority. In some cases, such as, for example, a large department store, a single remote vendor location 14 may require a large number of point of sale terminals 16, while in other cases, such as a convenience store, a single terminal 16 may be sufficient.

Each point of sale terminal 16 includes at least input means 18 (best seen in FIG. 3), such as a standard alphanumeric keyboard for the entry of numeric values representing each transaction that has been performed in connection with the terminal 16. Each terminal 16 further includes electronic means 20 for storing the inputted data, calculating the sales tax due on each transaction, and storing the calculated values. Each terminal 16 may further include a display 21 (such as a VCR, LED, or LCD display), as well as a printer 22.

As shown in FIG. 1, each remote vendor location 14 is linked via telephone lines 26 with the central computer 12. While such linkage may be direct, a preferred embodiment of the system 10 includes a data network 17 schematically illustrated in FIGS. 2 and 3. A plurality of data collection sub-stations 30 are provided for capturing data from various ones of the plurality of point of sale terminals 16 and retransmitting the collected data to the central terminal 12. As can most clearly be seen in FIG. 2, each data collection sub-station 30 is in electronic communication with a number of point of sale terminals 16 via first data lines 32. Similarly, the central computer 12 is linked electronically with each sub-station 30 via second data lines 34 which are, preferably, dedicated phone lines.

Figure 3:
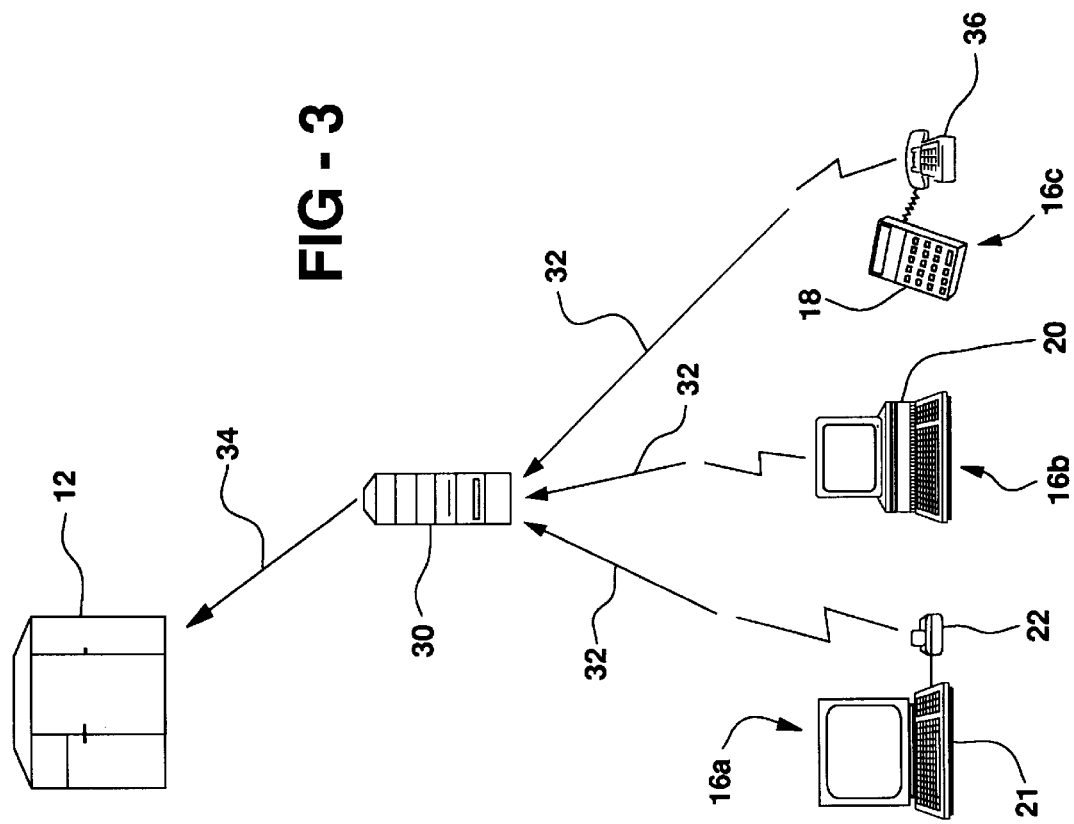
FIG. 3 is a detailed view of a portion of the data network of FIG. 2 illustrating different types of point of sale terminals.

FIG. 3 illustrates a portion of the network 17, in this case a single data collection sub-station 30 and a plurality of terminals 16A–16C. The terminals 16A–16C illustrate some of the forms in which the point of sale terminal 16 may be provided. For example, 16A is a stand alone terminal, 16B is a conventional personal computer programmed to function as a point of sale terminal, and 16C is a portable unit. Each terminal 16A–16C is in telephonic communication with the data collection sub-station 30 via first data lines 32. Since the stand alone terminal 16A and the software only version 16B are intended for conventional, permanent locations, they may simply be connected to the data network 17 via conventional phone lines. In the case of the portable unit 16, it must be periodically connected to the network 17 via a conventional telephone 36.

The data collection sub-station 30, in the depicted embodiment, serves as a data relay station. It is under the control of the central computer 12 via second data link 34. The central computer 12 sends control signals via the data link 34 to each data collection sub-station 30 which enable the sub-station 30 to perform its data collection function. Preferably, this data collection function is performed on each associated point of sale terminal 16 on a rotating, periodic basis. That is, data collection sub-station 30 will be contact a first terminal 16A and request that the sales transaction and tax data stored therein be transmitted via data link 32. After that data transmission is completed, sub-station 30 will then contact terminal 16B, and so on until data has been collected from all of terminals 16 associated with a particular substation 30. At that point, the sequence of terminal contact and data collection is begun again. Thus, the data collection sub-station 30 functions to turn a plurality of data streams periodically received from each terminal 16 into one continuous data stream which is sent directly to the central computer. In this way, the data collection network 17 of the present system 10 offers a practical way to collect a vast amount of electronic data via conventional telephone lines.

Figure 4:
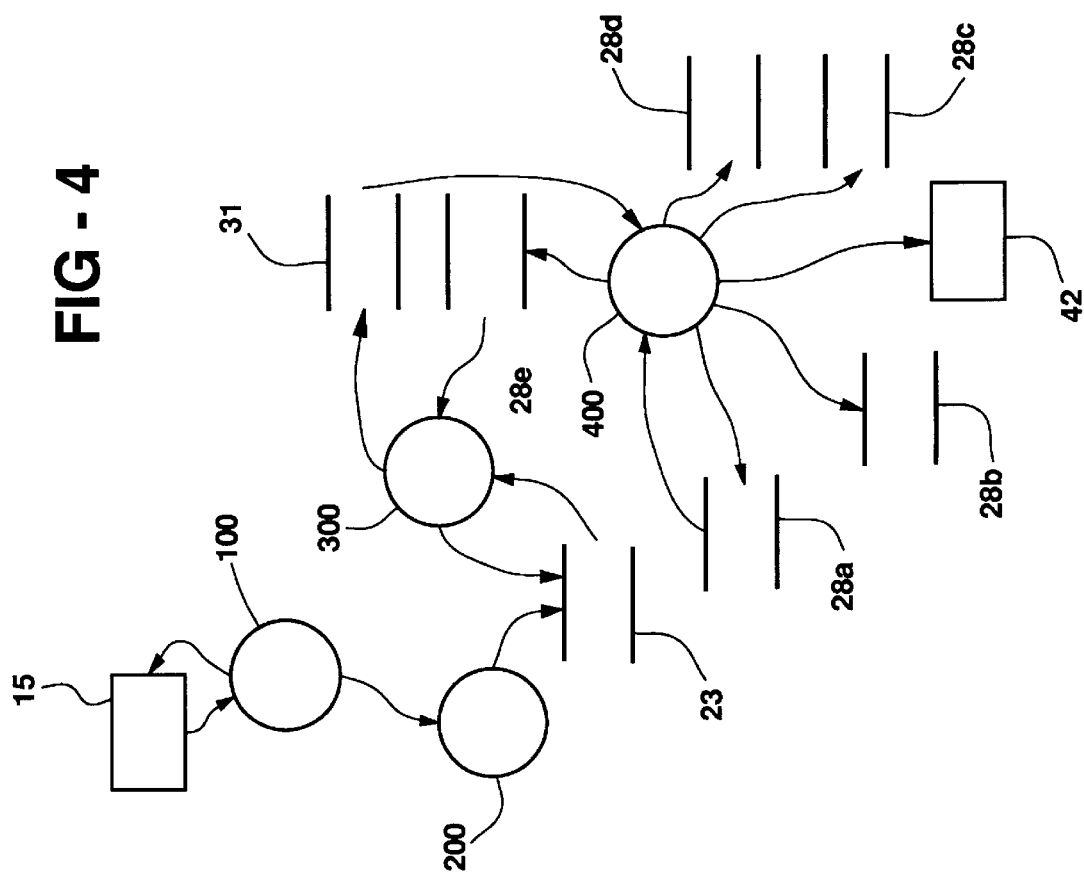
FIG. 4 is a high level system flow chart illustrating the flow of data in the system of the present invention, with circles representing processing steps, open ended rectangles representing data stores, complete rectangles representing outside entities and arrows indicating the direction of data flow.

FIG. 4 illustrates in flow chart fashion, the flow of data in the system 10 of the present invention. Data flow is initiated at 100 when a sale is made to a customer 15. The numerical data concerning the price of the items sold at 100 is transferred at 200 to the point of sale terminal 16 by means of input means 18. The data concerning the amount of the sales transaction, as well as the tax due on the transaction calculated by the terminal 16, is stored in the terminal 16 in the form of data file 23. The sales transaction and tax data stored in data file 23 is periodically collected by the data collection network 17 at 300 and is stored in the consolidated file 31. The consolidated data stored in 31 is then analyzed at 400 by central computer 12. The analyzed data may then be stored in a number of different data files, such as 28A (state sales tax data file), 28B (merchant reports), 28C (state tax reports), and 28D (non-compliance reports). These various data files 28A–28D may then be used by the system 10 to generate appropriate reports to be sent to the state governmental taxing authority 38, the merchant at the remote vendor location 14, or even to an outside governmental authority 42 such as the federal government.

The central computer 12 may also be electrically linked to a financial institution 39, such as a bank or credit union, which is also electronically linked to the remote vendor location. The central computer 12 may also generate a report on a merchant which is automatically sent to the financial institution 39. The amount reflecting transaction taxes collected by the merchant and owing to the state may be automatically transferred from financial institution 39 to the central computer 12, or, alternatively, directly to the state government 38.

Preferably, point of sale terminal 16 is in communication with a printer 22, which is operative to print an official customer receipt 24 reflecting both the transaction and the tax. In addition, the receipt 24 may include special coding or design elements indicating it is an official tax receipt. Since the present system can operate to generate an official receipt for all taxable transactions, consumers will expect to receive a receipt from each transaction. Thus, if a customer does not receive the official receipt, the customer may suspect that the merchant, or an employee of the merchant, has not entered the transaction in the reporting system, either for the purpose of evading payment of the transaction tax, or because of outright theft.

It is contemplated that, when the system of the present invention is implemented within a taxing authority, the appropriate governmental entity will pass the statutes and regulations necessary to ensure compliance. Such a legal mechanism preferably would include a system for receiving consumer reports of failure to receive an official tax receipt for a transaction. Thus, the official receipt 24 can provide another level of compliance and ensure that merchants and their employees will not circumvent the system by failing to enter the appropriate information therein. Again, the system 10 will provide advantageous to a merchant since it will help deter theft by employees, especially when compliance is enforced by the official tax receipt 24.

An automatic system for reporting and/or collecting transaction taxes has been described with regard to certain exemplifications and embodiments thereof. Doubtless, having had the benefit of the teachings of the present invention, one of skill in the art might design variations in the disclosed system without departing the scope of the present invention. For example, three embodiments of the point of sale terminal have been described, but it is possible that other designs may prove advantageous in certain circumstances. For example, rather than having a keyboard type of input, the terminal could include a scanner which would scan in receipts and register tapes generated by existing cash registers for subsequent storage within the terminal and eventual transmission as described previously. Furthermore, it is highly likely that certain existing electronic and computerized cash registers might be easily adapted to operate as point of sale terminals according to the present system without the necessity of providing a separate terminal and requiring a separate act of data entry. Furthermore, rather than each point of sale terminal being separately linked to a data reporting sub-station, it may prove advantageous in certain circumstances to network together a plurality of such terminals located in a single remote vendor location, with a single data link serving to connect the sub-station with the network of individual terminals. Also, while one intermediate level of data reporting sub-stations has been disclosed, it is possible that, especially in larger taxing authorities, a more complicated network may be required with additional intermediate levels of data collection devices. However, such variations are considered to be well within the ambit of one of skill in the art of designing automated and computerized systems. Thus, it is the claims appended hereto, as well as all reasonable equivalents thereof, rather than the exact depicted embodiments and exemplifications, which define the true scope of the present invention.

We claim:

1. A sales tax reporting system for automatically reporting financial transactions, which are subject to sales tax, to a central location, said system comprising at least one taxable transaction terminal disposed at each of a plurality of remote vendor locations for automatically recording taxable transaction occurrences on sales at said remote locations and including:

means for automatically inputting a first numeric value representing a price attributable to a taxable transaction into said terminal;

means for entering a second numeric value representing sales tax due for each said taxable transaction;

means for storing said first and second numeric values;

means for automatically generating transmissible data representing said stored first and second numeric values; and means for generating a printed tax receipt in response to said means for automatically generating transmissible data, said printed receipt displaying said first and second numeric values;

at least one data collection sub-station in electronic, two-way communication with a portion of said plurality of taxable transaction terminals and operative to contact, on a rotating periodic basis, each of said taxable transaction terminals within said portion and receive therefrom said transmissible data;

a central processing unit disposed at said central location and including a database having a data file corresponding to each said remote vendor location for storing said transmissible data generated at said remote vendor location, said central processing unit being programmed to generate on a periodic basis or when requested by an operator, a report of sales and tax due thereupon at a particular remote vendor location and stored in the respective data file; and an electronic data link connecting each said data collection sub-station with said central processing unit for automatic transmission of said transmissible data collected by said data collection sub-station.

2. The system of claim 1 wherein said means for generating a printed receipt is a computer printer in communication with said taxable transaction terminal, said printer being further operative to generate said receipt, said receipt further including an official insignia authorized by a taxing authority.

3. The system of claim 1 wherein said plurality of taxable transmission terminals includes at least one stand alone terminal.

4. The system of claim 1 wherein said plurality of taxable transaction terminals include at least one personal computer.

5. The system of claim 1 wherein said plurality of taxable transaction terminals includes at least portable, hand held terminal including a phone jack.

6. The system of claim 1 wherein said central processing unit is in electronic communication with a governmental taxing authority.

7. The system of claim 6 wherein said system further includes means for electronically transferring funds representing each of said second values generated at a particular taxable transaction terminal from said vendor location to said governmental taxing authority.

8. The system of claim 1 wherein said terminal further includes means for calculating said second numeric value on the basis of said inputted first numeric value.

9. The system of claim 1 wherein said central computer is further programmed to generate control signals directing said substation to periodically contact said taxable transaction terminals.

\* \* \* \* \*